UNITED STATES PATENT OFFICE.

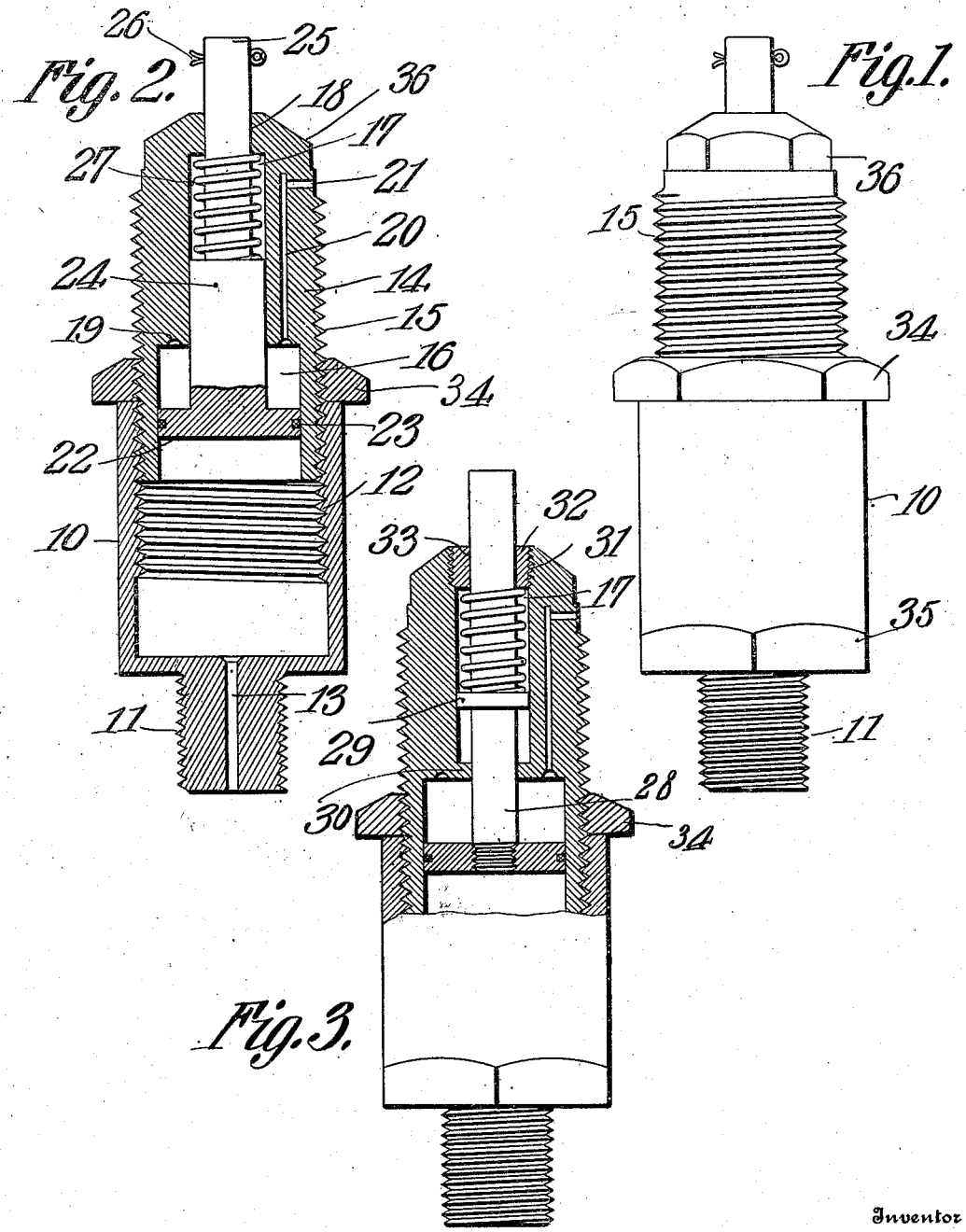

WILLIAM CLOTHWORTHY, OF GRAND RAPIDS, MICHIGAN.

LUBRICATOR.

No. 915,937.    Specification of Letters Patent.    Patented March 23, 1909.

Application filed June 6, 1908. Serial No. 437,164.

*To all whom it may concern:*

Be it known that I, WILLIAM CLOTH-WORTHY, a citizen of the United States, residing at Grand Rapids, in the county of Kent and State of Michigan, have invented a new and useful Lubricator, of which the following is a specification.

This invention relates to lubricators and has special reference to force feed lubricators adapted to feed a solid or semi-solid lubricant.

One object of the invention is to provide an improved form of such lubricator so arranged as to prevent the grease from clogging the plunger common in such devices with grease.

Another object of the invention is to provide a lubricator of the character described with an improved signal-rod or indicator.

With these and other objects in view, the invention consists of certain novel forms of construction and combinations of parts, hereinafter fully described, illustrated in the accompanying drawing, and specifically set forth in the claims.

In the accompanying drawings like characters of reference indicate like parts in the several views, and: Figure 1 is a side elevation of the lubricator constructed in accordance with this invention. Fig. 2 is a vertical sectional view therethrough. Fig. 3 is a side elevation partly in section of a modified form of the invention.

The numeral 10 indicates the body of the lubricator which is provided as at 11 with a stud or stem having the usual threads whereby it may be inserted in the opening through which the lubricant is to be fed. The stem 11 is formed with an axial bore 13 of sufficient size as to permit the flow therethrough of the solid or semi-solid lubricant intended to be contained in the body.

A plug or stop 14 is held within the body and is provided with screw threads 15 of proper proportion to engage screw threads 12 formed interiorly of the body 10. The plug 14 is recessed at the bottom as indicated at 16 and is further provided with the reduced or minor recessed portion 17, above the recess 16. At the top of the plug 14 there is provided an aperture as indicated at 18, and the plug is further provided with an annular groove 19 extending around the shoulder formed by the difference in the dimension of the major and minor recesses 16 and 17 respectively. Leading from the groove 19 through the plug or top 14 is a vent or waste port 20 extending lengthwise of the plug and provided with a branch 21 opening through the outer surface thereof.

Within the recess 16, is provided a follower piston as shown at 22. This follower piston preferably is grooved for a suitable packing as at 23.

Referring now to the form shown in Fig. 2, the follower piston has a plunger 24, formed thereon, plunger 24 having a reduced stem 25. The plunger 24 is of such size as to closely fit the upper recess, and the stem 25 is proportioned to fit the aperture 18 and is of such length as to extend upward therethrough at all times, being provided with the cotter 26, to prevent entire retraction of the stem within the aperture. By reason of the stem forming a reduced portion of the plunger 24, there is provided a space between the stem 25, and the side walls of the recess 17. In the space thus formed is held a spring, of the spiral form as indicated at 27. This spring is so arranged as to length and tension that it acts to press the plunger 24 downward and causes the piston 22, to assume its lowest position, the lowest position of the plunger being intended to be such that the bottom of said plunger will lie flush with the bottom of the plug 14.

Referring now to Fig. 3. The piston in this case is screwed to a stem 28, which is provided with a collar 29, fitting in the top portion of the recess. An annular collar 30, is provided between the two portions of the recess and is of such size as to closely engage the stem 28. The upper end of the reduced recess 17, opens directly out of the top of the plug and is provided with screw threads 31. Fitting this open portion of the recess is a plug 32, provided with screw threads to engage the threads 31, and further provided with a centrally disposed aperture 33 wherein the upper end of the stem 28, is arranged to move. The upper end of the stem 28, is of such length that when the collar 29, is in contact with the annular collar 30, the top of the stem will be substantially flush with the top of the nut 32.

In both the forms shown in Figs. 1 and 2, and the form shown in Fig. 3, there is provided a jam nut 34, mounted on the plug 14, so that the position of the latter may be properly maintained in the body 10. The body 10 in all cases is provided with the usual hexagonal portion 35, to enable the same to be properly attached to the bearing or crank pin box as may be desired. There is also provided a nut 36, on the plug to enable the same to be readily screwed in or out of the body.

In the operation of the device the body 10 is filled with a solid or semi-solid grease and the plug 14 is set therein and screwed down as far as it will go. This will cause the piston 22, to be forced up into the recess 16, and the spring 27 will thereby exert pressure tending to force the grease out of the aperture 13. As the grease is forced out of this aperture and used up the piston 22, will descend. When the indicator stem 25, reaches its lowest point, the plug is screwed down again into the body and the same operation is repeated. It will be noticed that there is at all times a proper amount of pressure exerted on the grease to cause the same to flow through the aperture.

It will be understood from the foregoing that the stem 25 serves, in effect, as an indicator, inasmuch as when its upper end is nearly flush with the upper face of the nut 36, the attendant or oiler will understand that a fresh supply of lubricant is needed.

Should any of the grease work up past the packing 23, on the piston 22, during the time that the piston is moving downward, it will not be forced into the cavity containing the spring 27 when the piston moves upward, but will pass up the vent 20, and branch 21, and out of the cup. The spring 27 will thus at all times be kept free from an accumulation of grease, and will operate properly under all conditions.

It is obvious that minor changes may be made in the form and construction of the device without departing from the material principles thereof. It is not therefore desired to confine the invention to the exact form herein shown and described, but it is wished to properly include such as come within the scope of this invention.

Having thus described the invention, what is claimed, is:—

1. In a device of the class described, a body portion provided with an aperture at the lower end thereof and internal screw threads, a plug arranged to fit within said body portion provided with a recess at the lower end thereof, said plug being provided also with a minor recess extending upward from the first mentioned recess and with an aperture leading from the minor recess to the top of said plug, said plug being further provided with a vent leading from the upper end of the first mentioned recess therein to the exterior of said plug, a piston held to move in the first mentioned recess, a plunger fixed to said piston and fitting the minor recess, a stem attached to said plunger, passing through and fitting the aperture in the plug, a spring held around the said stem and bearing against said plunger, to force the same down and a stop to limit the downward motion of said plunger.

2. In a device of the class described, a body portion having internal screw threads and a centrally disposed aperture in the bottom, a plug held within said body portion provided with external threads to engage the internal threads of the said body portion and further provided with a centrally disposed lower recess in the bottom thereof, and with a minor upper recess leading from the centrally disposed recess, and with an aperture extending from the minor recess to the top of said plug, and further, with a vent extending from the lower recess to the exterior of said plug and the said lower recess opening into an annular groove connecting with said vent, a piston held within the lower recess, a plunger rigidly attached to said piston to extend within the upper recess and closely fit the same, an indicator stem rigidly attached to the plunger and passing through the said aperture, said stem being spaced from the walls of the upper recess, a spring held in the annular chamber formed by the stem and the walls of the upper recess and arranged to force the plunger down, a stop to limit the downward motion of said plunger, and a lock nut carried on said plug to lock the same in position within the body.

In testimony that I claim the foregoing as my own, I have hereto affixed my signature in the presence of two witnesses.

WILLIAM CLOTHWORTHY.

Witnesses:
C. G. TURNER,
HARRY E. RODGERS.